United States Patent [19]
Sigmar et al.

[11] Patent Number: 6,041,283
[45] Date of Patent: Mar. 21, 2000

[54] REMOTE CONTROL SYSTEM FOR SEISMIC ACQUISITION

[75] Inventors: Axel M. Sigmar, Sugar Land; James W. Iseli, Allen; Jozsef Szalay, Austin; Janos Haide, Austin; Andras A. Feszthammer, Austin, all of Tex.

[73] Assignee: Input/Output, Inc., Stafford, Tex.

[21] Appl. No.: 09/151,260

[22] Filed: Sep. 11, 1998

Related U.S. Application Data

[60] Provisional application No. 60/095,704, Aug. 7, 1998.

[51] Int. Cl.$^7$ .................................................. G06F 19/00
[52] U.S. Cl. ............................................... 702/16; 702/14
[58] Field of Search ................... 367/133, 77; 702/14, 702/16; 395/200; 370/465; 379/53; 175/27

[56] References Cited

U.S. PATENT DOCUMENTS

| | | | |
|---|---|---|---|
| 3,719,891 | 3/1973 | Lee | 325/61 |
| 3,820,074 | 6/1974 | Toman | 340/151 |
| 3,909,811 | 9/1975 | Adler | 340/189 |
| 4,031,513 | 6/1977 | Simciak | 340/152 T |
| 4,042,906 | 8/1977 | Ezell | 340/15.5 |
| 4,152,691 | 5/1979 | Ward | 340/15.5 |
| 4,219,810 | 8/1980 | Joosten | 340/853 |
| 4,366,561 | 12/1982 | Klein | 367/77 |
| 4,493,063 | 1/1985 | Tims et al. | 367/77 |
| 4,628,494 | 12/1986 | Rialan et al. | 307/79 |
| 4,663,744 | 5/1987 | Russell et al. | 367/76 |
| 4,725,992 | 2/1988 | McNatt et al. | 367/77 |
| 4,807,200 | 2/1989 | Montes et al. | 367/76 |
| 4,809,005 | 2/1989 | Counselman | 342/352 |
| 4,815,044 | 3/1989 | Deconinck et al. | 367/77 |
| 4,882,743 | 11/1989 | Mahmoud | 379/53 |
| 4,905,205 | 2/1990 | Rialan | 367/77 |
| 5,419,405 | 5/1995 | Patton | 175/27 |
| 5,438,329 | 8/1995 | Gastouniotis et al. | 340/870.02 |
| 5,448,230 | 9/1995 | Schanker et al. | 340/870.03 |
| 5,451,938 | 9/1995 | Brennan, Jr. | 340/870.14 |
| 5,481,502 | 1/1996 | Cretin et al. | 367/77 |
| 5,491,473 | 2/1996 | Gilbert | 340/870.01 |
| 5,539,396 | 7/1996 | Mori et al. | 340/870.01 |
| 5,548,562 | 8/1996 | Helgerud et al. | 367/14 |
| 5,583,493 | 12/1996 | Lysen | 340/870.01 |
| 5,636,211 | 6/1997 | Newlin et al. | 370/465 |
| 5,706,250 | 1/1998 | Rialan et al. | 367/77 |
| 5,721,538 | 2/1998 | Tubel et al. | 340/853.4 |
| 5,726,646 | 3/1998 | Bane et al. | 340/870.03 |
| 5,765,112 | 6/1998 | Fitzgerald et al. | 455/509 |
| 5,809,431 | 9/1998 | Bustamante et al. | 455/562 |
| 5,822,273 | 10/1998 | Bary et al. | 367/77 |
| 5,842,125 | 11/1998 | Modzelesky | 455/426 |
| 5,864,772 | 1/1999 | Alvarado et al. | 702/9 |

*Primary Examiner*—Christine K. Oda
*Assistant Examiner*—Victor J. Taylor
*Attorney, Agent, or Firm*—Haynes and Boone, LLP; Todd Mattingly

[57] ABSTRACT

A system for remotely controlling and monitoring the acquisition of seismic data. The system includes remote equipment for collecting seismic data and for transmitting and receiving communication signals to and from a remote location. The system also includes local equipment for transmitting and receiving communication signals to and from the remote location. In this manner, the collection of seismic data at remote locations can be controlled and monitored locally.

9 Claims, 10 Drawing Sheets

REMOTE CONTROL SYSTEM FOR SEISMIC ACQUISITION

This application is a continuation-in-part of provisional patent application Ser. No. 60/095,704 filed on Aug. 7, 1998.

BACKGROUND OF THE INVENTION

This invention relates generally to remote control systems, and in particular to remote control systems for seismic acquisition systems.

Seismic acquisition systems are used to gather seismic data. Typically seismic acquisition systems are used to gather seismic data in remote locations all around the world. Furthermore, seismic acquisition systems are commonly installed and operated on mobile platforms such as, for example, trucks, barges and boats. Existing seismic acquisition systems do not permit remote control and monitoring of the acquisition of seismic data.

The present invention is directed to overcoming one or more of the limitations of the existing seismic acquisition systems.

SUMMARY OF THE INVENTION

According to one aspect of the present invention, a system for remotely controlling and monitoring the acquisition of seismic data is provided that includes a seismic data acquisition system, an Ethernet communications interface, an ISDN router, a first ISDN communications interface, a first ISDN converter, a first RS-422 communications interface, a first microwave communications transceiver, a second microwave communications transceiver, a second RS-422 communications interface, a second ISDN converter, a second ISDN communications interface, an ISDN network, and a customer support center. The Ethernet communications interface is operably coupled to the seismic data acquisition system. The ISDN router is operably coupled to the Ethernet communications interface. The first ISDN communications interface is operably coupled to the ISDN router. The first ISDN converter is operably coupled to the first ISDN communications interface. The first RS-422 communications interface is operably coupled to the ISDN converter. The first microwave transceiver is operably coupled to the first RS-422 communications interface. The second microwave transceiver is operably coupled to the first microwave transceiver. The second RS-422 communications interface is operably coupled to the second microwave transceiver. The second ISDN converter is operably coupled to the second RS-422 communications interface. The second ISDN communications interface is operably coupled to the second ISDN converter. The ISDN network is operably coupled to the second ISDN communications interface. The customer support center is operably coupled to the ISDN network.

According to another aspect of the present invention, a system for remotely controlling and monitoring the acquisition of seismic data is provided that includes a seismic data acquisition system, an Ethernet communications system, an ISDN router, an ISDN communications interface, an ISDN converter, an RS-422 communications interface, a first satellite transceiver, a satellite, a second satellite transceiver, an ISDN network, and a customer support center. The Ethernet communications interface is operably coupled to the seismic data acquisition system. The ISDN router is operably coupled to the Ethernet communications interface. The ISDN communications interface operably coupled to the ISDN router. The ISDN converter is operably coupled to the ISDN communications interface. The RS-422 communications interface is operably coupled to the ISDN converter. The first satellite transceiver is operably coupled to the RS-422 communications interface. The satellite is operably is coupled to the first satellite transceiver. The second satellite transceiver is operably coupled to the satellite. The ISDN network is operably coupled to the second satellite transceiver. The customer support center is operably coupled to the ISDN network.

According to another aspect of the present invention, a system for remotely controlling and monitoring the acquisition of seismic data is provided that includes a seismic data acquisition system, an Ethernet communications interface, a first Ethernet radio transceiver, a second Ethernet radio transceiver, a converter, a telephone system, a PSTN network, and a customer support center. The Ethernet communications interface is operably coupled to the seismic data acquisition system. The first Ethernet radio transceiver is operably coupled to the Ethernet communications interface. The second Ethernet radio transceiver is operably coupled to the first Ethernet radio transceiver. The converter is operably coupled to the second Ethernet radio transceiver. The telephone system is operably coupled to the converter. The PSTN network is operably coupled to the telephone system. The customer support center is operably coupled to the ISDN network.

According to another aspect of the present invention, a system for remotely controlling and monitoring the acquisition of seismic data is provided that includes remote equipment, local equipment, and a central command center. The remote equipment is operably coupled to the local equipment and is adapted to collect seismic data and to transmit and receive communication signals. The local equipment is operably coupled to the remote equipment and is adapted to transmit and receive communication signals. The central command center is operably coupled to the local equipment and is adapted to transmit and receive the communication signals and provide a user interface.

According to another aspect of the present invention, a method of remotely controlling and monitoring the acquisition of seismic data is provided that includes remotely transmitting and receiving communication signals; locally transmitting and receiving communication signals; and locally providing a user interface to the communication signals.

DETAILED DESCRIPTION OF THE ILLUSTRATIVE EMBODIMENTS

A system for remotely monitoring and controlling the acquisition of seismic data is disclosed. The system permits remote sensing, monitoring, and control of seismic data collection. In this manner, expert control, advice and interpretation of the collection and processing of seismic data can be provided for a plurality of remote sites from a single local command and control center. Although the detailed description of the illustrative embodiments is directed to the remote collection, monitoring and control of seismic data, the teachings of the present disclosure will have broad applicability to remote sensing, monitoring and control of processes generally.

Figure 1:
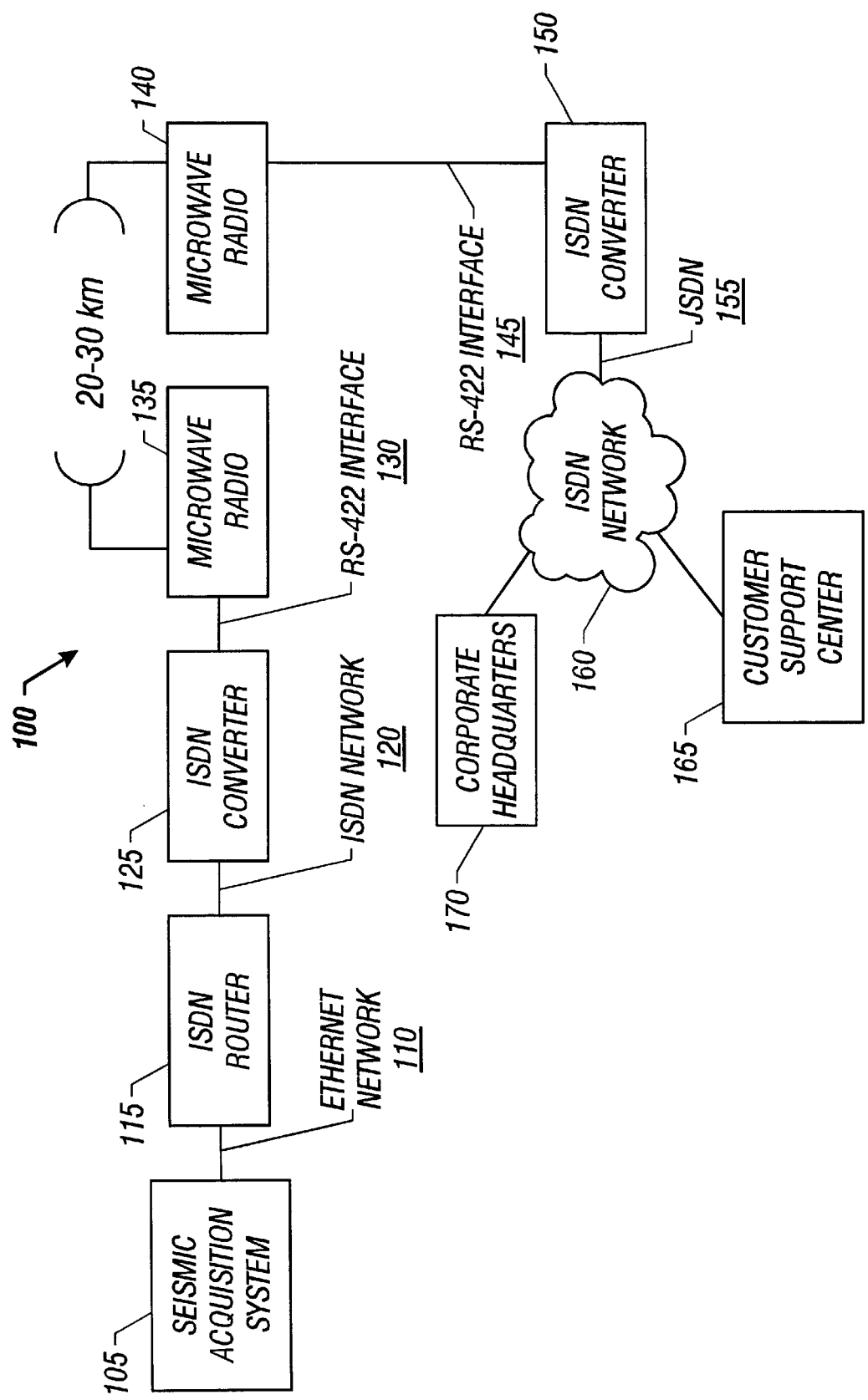
FIG. 1 is a schematic illustration of a first embodiment of a system for remotely controlling and monitoring the acquisition of seismic data.

Referring initially to FIG. 1, a system 100 for remotely controlling and monitoring the acquisition of seismic data includes a seismic data acquisition system 105, an Ethernet communications interface 110, an ISDN router 115, a first ISDN communications interface 120, a first ISDN converter 125, a first RS-422 communications interface 130, a first microwave transceiver 135, a second microwave transceiver 140, a second RS-422 communications interface 145, a second ISDN converter 150, a second ISDN communications interface 155, an ISDN network 160, a customer support center 165, and a corporate headquarters 170.

The seismic data acquisition system 105 may comprise any number of commercially available seismic data acquisition systems such as, for example, a System 2000, a System 2 or an RSR system, all available from Input Output, Inc. in Stafford, Tex.

In a preferred embodiment, the seismic data acquisition system 105 includes conventional equipment for the video conferencing, voice communication, fax communication, and data collection. In a particularly preferred embodiment the seismic data acquisition system 105 communicates in a conventional manner with the customer support center 165 and corporate headquarters 170 via video, fax, audio, and data signals.

The Ethernet communications interface 110 may comprise any number of commercially available Ethernet communications interfaces. The Ethernet communications interface 110 is operably coupled to the seismic data acquisition system 105. The Ethernet communications interface 110 may be operably coupled to the seismic data acquisition system 105 using any number of commercially available interfaces such as, for example, 10 Base-T or 10 Base-2. In a preferred embodiment, the Ethernet communications interface 110 is operably coupled to the seismic data acquisition system 105 using 10 Base-T.

The ISDN router 115 may comprise any number of commercially available ISDN routers such as, for example, Ascend Pipeline 50 or Intel Express 8100. In a preferred embodiment, the ISDN router 115 comprises an Ascend Pipeline 50. In an alternative embodiment, an Ascend 75 may be substituted for the ISDN router 115. As will be recognized by persons having ordinary skill in the art, ISDN refers to an industry standard protocol for communications.

The ISDN router 115 is operably coupled to the Ethernet communications interface 110. The ISDN router 115 may be operably coupled to the Ethernet communications interface 110 using any number of commercially available interfaces such as, for example, 10 Base-T. In a preferred embodiment, the ISDN router 115 is operably coupled to the Ethernet communications interface 110 using 10 Base-T.

The first ISDN communications interface 120 may comprise any number of commercially available ISDN communications interfaces such as, for example, ISDN. As will be recognized by persons having ordinary skill in the art, the ISDN communications interface is an industry standard interface. In a preferred embodiment, the first ISDN communications interface 120 comprises an ISDN interface.

The first ISDN communications interface 120 is operably coupled to the ISDN router 115. The first ISDN communications interface 120 may be operably coupled to the ISDN router 115 using any number of commercially available interfaces such as, for example, 10 Base-T. In a preferred embodiment, the first ISDN communications interface 120 is operably coupled to the ISDN router 115 using 10 Base-T.

The first ISDN converter 125 may comprise any number of commercially available ISDN converters such as, for example, DICA. In a preferred embodiment, the first ISDN converter 125 comprises a DICA available from Data Telemark.

The first ISDN converter 125 is operably coupled to the first ISDN communications interface 120. The first ISDN converter 125 may be operably coupled to the first ISDN communications interface 120 using any number of commercially available interfaces such as, for example, ISDN. In a preferred embodiment, the first ISDN converter 125 is operably coupled to the first ISDN communications interface 120 using ISDN.

The RS-422 communications interface 130 is operably coupled to the first ISDN converter 125. The RS-422 communications interface 130 may be operably coupled to the first ISDN converter 125 using any number of commercially available interfaces. As will be recognized by persons having ordinary skill in the art, RS-422 refers to an industry standard protocol for communciations.

The first microwave radio transceiver 135 may comprise any number of commercially available microwave radio transceivers such as, for example, Cylink. The first microwave radio transceiver 135 is operably coupled to the RS-422 communications interface 130. The first microwave transceiver 135 may be operably coupled to the RS-422 communications interface 130 using any number of commercially available interfaces.

The second microwave radio transceiver 140 may comprise any number of commercially available microwave radio transceivers such as, for example, Cylink. The second microwave radio transceiver 140 is operably coupled to the first microwave radio transceiver 135. The second microwave transceiver 140 may be operably coupled to the first microwave radio transceiver 135 using any number of commercially available interfaces.

The second RS-422 communications interface 145 is operably coupled to the second microwave radio transceiver 140. The second RS-422 communications interface 145 may be operably coupled to the second microwave radio transceiver 140 using any number of commercially available interfaces.

The second ISDN converter 150 may comprise any number of commercially available ISDN converters such as, for example, DICA. In a preferred embodiment, the second ISDN converter 150 comprises a DICA available from Telemark. The second ISDN converter 150 is operably coupled to the second RS-422 communications interface 145.

The second ISDN communications interface 155 may comprise any number of commercially available ISDN communications interfaces. The second ISDN communications interface 155 is operably coupled to the second ISDN converter 150. The second ISDN communications interface 155 may be operably coupled to the second ISDN converter 150 using any number of commercially available interfaces.

The ISDN network 160 may comprise any number of commercially available ISDN networks. The ISDN network 160 is operably coupled to the second ISDN communications interface 155. The ISDN network 160 may be operably coupled to the second ISDN communications interface 155 using any number of commercially available interfaces.

The customer support center 165 may comprise any number of commercially available customer support centers. In a preferred embodiment, the customer support center 165 includes conventional equipment for the video conferencing, voice communication, fax communication, and data collection. In a particularly preferred embodiment the customer support center 165 communicates in a conventional manner with the seismic acquisition system 105 and corporate headquarters 170 via video, fax, audio, and data signals.

The customer support center 165 is operably coupled to the ISDN network 160. The customer support center 165 may be operably coupled to the ISDN network 160 using any number of commercially available interfaces.

The corporate headquarters 170 may comprise any number of commercially available corporate headquarters. In a preferred embodiment, the seismic data acquisition system 105 includes conventional equipment for the video conferencing, voice communication, fax communication, and data collection. In a particularly preferred embodiment the corporate headquarters 170 communicates in a conventional manner with the customer support center 165 and the seismic acquisition system 105 via video, fax, audio, and data signals.

The corporate headquarters 170 is operably coupled to the ISDN network 160. The corporate headquarters 170 may be operably coupled to the ISDN network 160 using any number of commercially available interfaces.

In a preferred embodiment, the system 100 includes a plurality of local and remote sites that are integrated in a conventional manner into a network. In this manner, the monitoring and control of seismic accusation at a plurality of remote sites can be networked and managed from a plurality of command and control centers.

Figure 2:
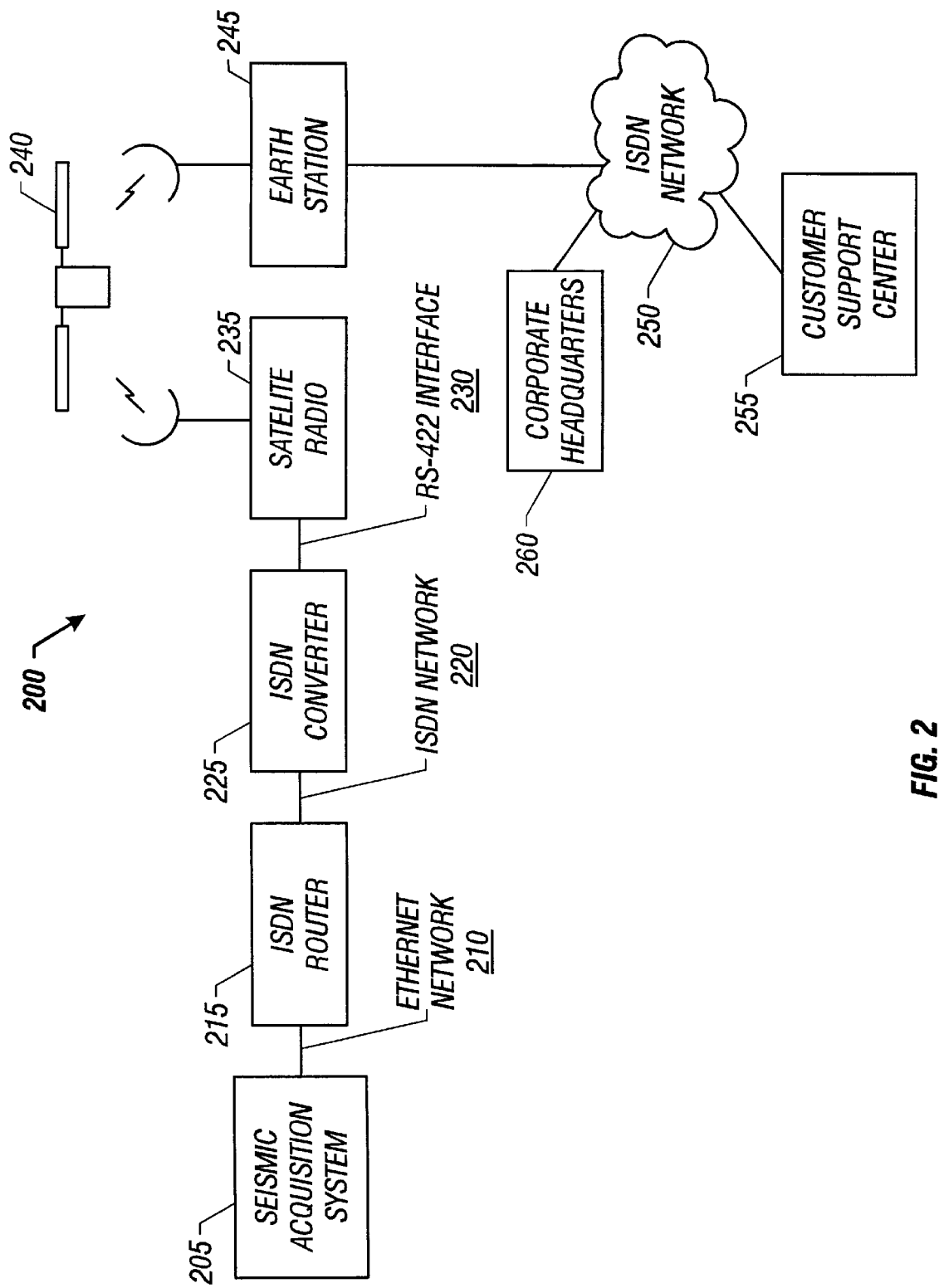
FIG. 2 is a schematic illustration of a second embodiment of a system for remotely controlling and monitoring the acquisition of seismic data.

Referring to FIG. 2, a system 200 for remotely controlling and monitoring the acquisition of seismic data includes a seismic data acquisition system 205, an Ethernet communications interface 210, an ISDN router 215, an ISDN communications interface 220, an ISDN converter 225, an RS-422 communications interface 230, a first satellite transceiver 235, a satellite 240, a second satellite transceiver 245, an ISDN network 250, a customer support center 255, and a corporate headquarters 260.

The seismic data acquisition system 205 may comprise any number of commercially available seismic data acquisition systems. In a preferred embodiment, the seismic data acquisition system 205 includes conventional equipment for the video conferencing, voice communication, fax communication, and data collection. In a particularly preferred embodiment the seismic data acquisition system 205 communicates with the customer support center 255 and corporate headquarters 260 via video, fax, audio, and data signals.

The Ethernet communications interface 210 may comprise any number of commercially available Ethernet communications interfaces. The Ethernet communications interface 210 is operably coupled to the seismic data acquisition system 205. The Ethernet communications interface 210 may be operably coupled to the seismic data acquisition system 205 using any number of commercially available interfaces.

The ISDN router 215 may comprise any number of commercially available ISDN routers. The ISDN router 215 is operably coupled to the Ethernet communications interface 210. The ISDN router 215 may be operably coupled to the Ethernet communications interface 210 using any number of commercially available interfaces.

The ISDN communications interface 220 may comprise any number of commercially available ISDN communications interfaces. The ISDN communications interface 220 is operably coupled to the ISDN router 215. The ISDN communications interface 220 may be operably coupled to the ISDN router 215 using any number of commercially available interfaces.

The ISDN converter 225 may comprise any number of commercially available ISDN converters. The ISDN converter 225 is operably coupled to the ISDN communications interface 220. The ISDN converter 225 may be operably coupled to the ISDN communications interface 220 using any number of commercially available interfaces.

The RS-422 communications interface 230 may comprise any number of commercially available RS-422 communications interfaces. As will be recognized by persons having ordinary skill in the art, RS-422 refers to an industry standard communications interface. The RS-422 communications interface 230 is operably coupled to the ISDN converter 225. The RS-422 communications interface 230 may be operably coupled to the ISDN converter 225 using any number of commercially available interfaces.

The first satellite transceiver 235 may comprise any number of commercially available satellite transceivers. The first satellite transceiver 235 is operably coupled to the RS-422 communications interface 230. The first satellite transceiver 235 may be operably coupled to the RS-422 communications interface 230 using any number of commercially available interfaces.

The satellite 240 may comprise any number of commercially available satellites. The satellite 240 is operably coupled to the first satellite transceiver 235. The satellite 240 may be operably coupled to the first satellite transceiver 235 using any number of commercially available interfaces.

The second satellite transceiver 245 may comprise any number of commercially available satellite transceivers. The second satellite transceiver 245 is operably coupled to the satellite 240. The second satellite transceiver 245 may be operably coupled to the satellite 240 using any number of commercially available interfaces.

The ISDN network 250 may comprise any number of commercially available ISDN networks. The ISDN network 250 is operably coupled to the second satellite transceiver 245. The ISDN 250 may be operably coupled to the second satellite transceiver 245 using any number of commercially available interfaces.

The customer support center 255 may comprise any number of commercially available customer support centers.

In a preferred embodiment, the customer support center 255 includes conventional equipment for the video conferencing, voice communication, fax communication, and data collection. In a particularly preferred embodiment the customer support center 255 communicates in a conventional manner with the seismic acquisition system 205 and corporate headquarters 260 via video, fax, audio, and data signals.

The customer support center 255 is operably coupled to the ISDN network 250. The customer support center 255 may be operably coupled to the ISDN network 250 using any number of commercially available interfaces.

The corporate headquarters 260 may comprise any number of commercially available corporate headquarters. In a preferred embodiment, the corporate headquarters 260 includes conventional equipment for the video conferencing, voice communication, fax communication, and data collection. In a particularly preferred embodiment the corporate headquarters 260 communicates in a conventional manner with the seismic acquisition system 205 and customer support center 255 via video, fax, audio, and data signals.

The corporate headquarters 260 is operably coupled to the customer support center 255. The corporate headquarters 260 may be operably coupled to the customer support center 255 using any number of commercially available interfaces.

In a preferred embodiment, the system 200 includes a plurality of local and remote sites that are integrated in a conventional manner into a network. In this manner, the monitoring and control of seismic acquisition at a plurality of remote sites can be networked and managed from a plurality of command and control centers.

Figure 3:
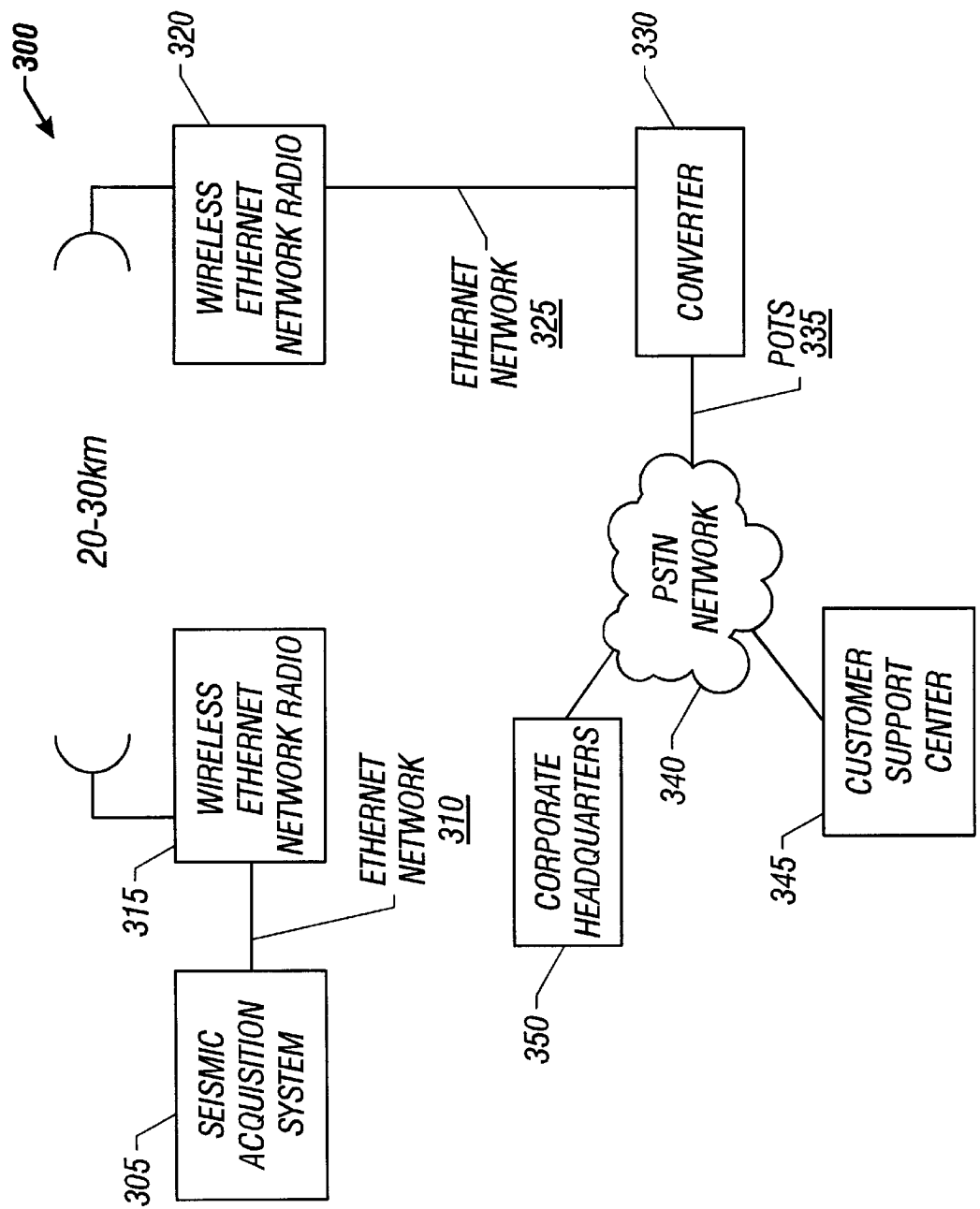
FIG. 3 is a schematic illustration of a third embodiment of a system for remotely controlling and monitoring the acquisition of seismic data.
Figure 4:
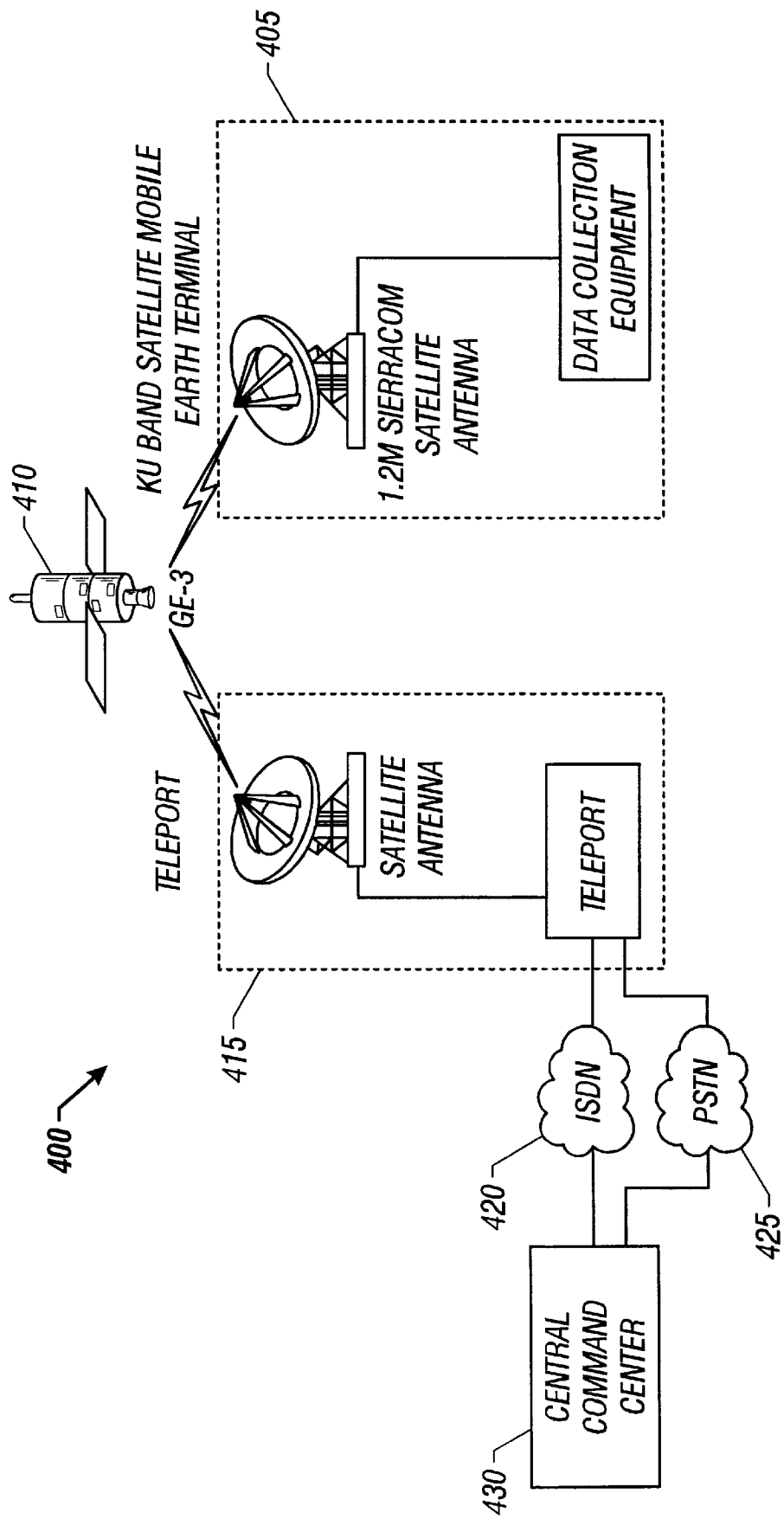
FIG. 4 is a schematic diagram of a fourth embodiment of a system for remotely controlling and monitoring the acquisition of seismic data.

Referring to FIG. 3, a system 300 for remotely controlling and monitoring the acquisition of seismic data includes a seismic data acquisition system 305, a first Ethernet communications interface 310, a first Ethernet radio transceiver 315, a second Ethernet radio transceiver 320, a second Ethernet communications interface 325, a converter 330, a telephone system 335, a PSTN network 340, a customer support center 345, and a corporate headquarters 350.

The seismic data acquisition system 305 may comprise any number of commercially available seismic data acquisition systems. In a preferred embodiment, the seismic data acquisition system 305 includes conventional equipment for the video conferencing, voice communication, fax communication, and data collection. In a particularly preferred embodiment the seismic acquisition system 305 communicates in a conventional manner with the customer support center 345 and corporate headquarters 350 via video, fax, audio, and data signals.

The first Ethernet communications interface 310 may comprise any number of commercially available Ethernet communications interfaces. The first Ethernet communications interface 310 is operably coupled to the seismic acquisition system 305. The first Ethernet communications interface 310 may be operably coupled to the seismic acquisition system 305 using any number of commercially available interfaces.

The first Ethernet radio transceiver 315 may comprise any number of commercially available Ethernet radio transceivers. The first Ethernet radio transceiver 315 is operably coupled to the first Ethernet communications interface 310. The first Ethernet radio transceiver 315 may be operably coupled to the first Ethernet communications interface 310 using any number of commercially available interfaces.

The second Ethernet radio transceiver 320 may comprise any number of commercially available Ethernet radio transceivers. The second Ethernet radio transceiver 320 is operably coupled to the first Ethernet radio transceiver 315. The second Ethernet radio transceiver 320 may be operably coupled to the first Ethernet radio transceiver 315 using any number of commercially available interfaces.

The second Ethernet communications interface 325 may comprise any number of commercially available Ethernet communications interfaces. The second Ethernet communications interface 325 is operably coupled to the second Ethernet radio transceiver 320. The second Ethernet communications interface 325 may be operably coupled to the second Ethernet radio transceiver 320 using any number of commercially available interfaces.

The converter 330 may comprise any number of commercially available converters. The converter 330 is operably coupled to the second Ethernet communications interface 325. The converter 330 may be operably coupled to the second Ethernet communications interface 325 using any number of commercially available interfaces.

The telephone system 335 may comprise any number of commercially available telephone systems. The telephone system 335 is operably coupled to the converter 330. The telephone system 335 may be operably coupled to the converter 330 using any number of commercially available interfaces.

The PSTN 340 may comprise any number of commercially available PSTN's. The PSTN 340 is operably coupled to the telephone system 335. The PSTN 340 may be operably coupled to the telephone system 335 using any number of commercially available interfaces.

The customer support center 345 may comprise any number of commercially available customer support centers. In a preferred embodiment, the customer support center 345 includes conventional equipment for the video conferencing, voice communication, fax communication, and data collection. In a particularly preferred embodiment the customer support center 345 communicates in a conventional manner with the seismic acquisition system 305 and corporate headquarters 350 via video, fax, audio, and data signals.

The customer support center 345 is operably coupled to the PSTN 340. The customer support center 345 may be operably coupled to the PSTN 340 using any number of commercially available interfaces.

The corporate headquarters 350 may comprise any number of commercially available corporate headquarters. In a preferred embodiment, the corporate headquarters 350 includes conventional equipment for the video conferencing, voice communication, fax communication, and data collection. In a particularly preferred embodiment the corporate headquarters 350 communicates in a conventional manner with the seismic acquisition system 305 and customer support center 345 via video, fax, audio, and data signals.

The corporate headquarters 350 is operably coupled to the PSTN 340. The corporate headquarters 350 may be operably coupled to the PSTN 340 using any number of commercially available interfaces.

In a preferred embodiment, the system 300 includes a plurality of local and remote sites that are integrated in a conventional manner into a network. In this manner, the monitoring and control of seismic accusation at a plurality of remote sites can be networked and managed from a plurality of command and control centers.

Referring to FIGS. 4–7, a particularly preferred embodiment of a system 400 for remotely controlling and monitoring the acquisition of seismic data includes remote equipment 405, a satellite 410, local equipment 415, an ISDN communications interface 420, a PSTN communications interface 425, and a central command center 430. The system 400 provides video-conferencing, two-way voice and data communications, and remote control and monitoring of seismic data acquisition. In a preferred embodiment, the satellite 410 is in geostationary orbit above the Earth's equator at an altitude of 22,000 miles. In a preferred embodiment, the ISDN communications interface 420 comprises a high-speed ISDN communication interface. The ISDN communications interface 420 provides the communication link for video conferencing and seismic data and control signals. The PSTN 425 may comprise any number of commercially available telephone systems.

Figure 5:
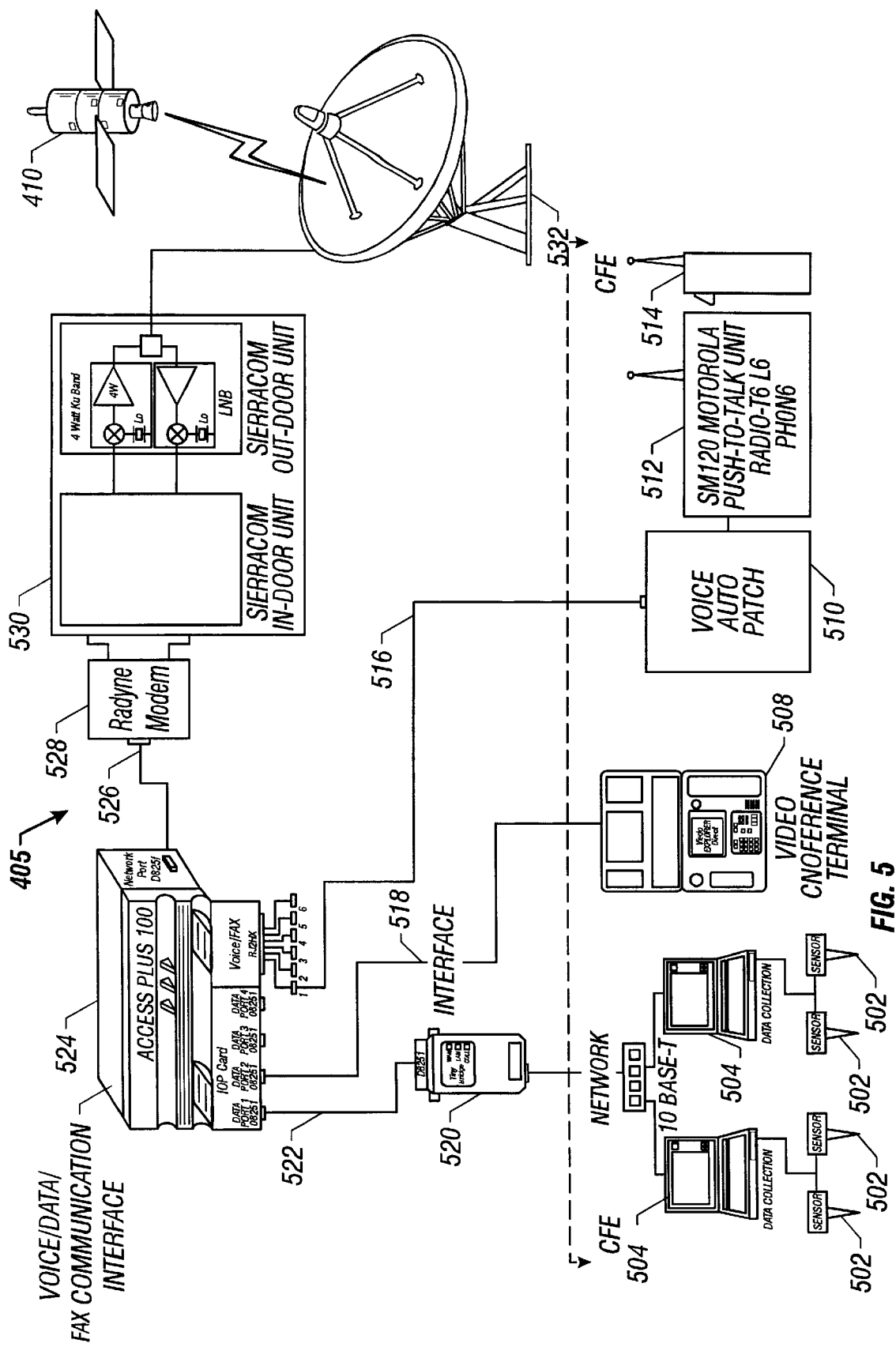
FIG. 5 is a detailed schematic diagram of the remote equipment used in the system of FIG. 4.

Referring to FIG. 5, the remote equipment 405 includes sensors 502, data collection and control computers 504, an Ethernet hub 506, a VideoEXPLORER 508, a voice communication interface 510, a Motorola M120 radio telephone base station 512, radio telephones 514, a telephone system interface 516, an RS-422 interface 518, a local area network 520, another RS-422 interface 522, a voice/data/fax communications interface 524, another RS-422 interface 526, a Raydyne modem 528, a SierraCom transceiver 530, and a 1.2 m SierraCom Ku band satellite dish 532.

The sensors 502 provide seismic signals and may comprise any number of commercially available seismic sensors. The data collection and control computers 504 receive and process the signals generated by the sensors 502, and control the operation of the sensors 502. The computers 504 may comprise any number of commercially available data collection and control computers such as, for example, Radisys. In a preferred embodiment, the data collection and control computers 504 comprise Radisys available from Input Output Inc. In a preferred embodiment, the data collection and control computers 504 include interface cards that output signals in 10 Base-T format.

The data collection and control computers 504 are operably coupled to corresponding sensors 502. The data collection and control computers 504 may be operably coupled to the sensors 502 using any number of commercially available interfaces.

The Ethernet hub 506 may comprise any number of commercially available Ethernet hubs such as, for example, Netgar EN 104, 3Com DCH 3406 or Intel OfficeConnect TP4.

The Ethernet hub 506 is operably coupled to the data collection and control computers 504. The Ethernet hub 506 may be operably coupled to the data collection and control computers 504 using any number of commercially available interfaces such as, for example, 10 Base-T or 10 Base 2. In a preferred embodiment, the Ethernet hub 506 is operably coupled to the data collection and control computers 504 using 10 Base T.

The VideoEXPLORER 508 may comprise any number of commercially available video conferencing devices such as, for example, Tandberg, VTel or PictureTel. In a preferred embodiment, the VideoEXPLORER 508 comprises a Tandberg.

The voice communications interface 510 interfaces to an analog port of the interface 524 and provides two-way radio communication and may comprise any number of commercially available voice communication interfaces such as, for example, Motorola Radio Telephone Interconnect. In a preferred embodiment, the voice communication interface 510 comprises a Voice Auto Patch available from Motorola as part number MRTI 500x.

The radio telephone base unit 512 may comprise any number of commercially available radio telephone base unit such as, for example, Motorola SM120. In a preferred embodiment, the radio telephone base unit 512 comprises a SM120 push-to-talk available from Motorola.

The radio telephone base unit 512 is operably coupled to the voice communication interface 510. The radio telephone base unit 512 may be operably coupled to the voice communication interface 510 using any number of commercially available interfaces such as, for example, a Motorola Accessory Interface.

The radio telephones 514 may comprise any number of commercially available radio telephones such as, for example, Motorola. In a preferred embodiment, the radio telephones 514 comprise a two-way Motorola radio telephone.

The radio telephones 514 are operably coupled to the radio telephone base unit 512. The radio telephones 514 may be operably coupled to the radio telephone base unit 512 using any number of commercially available interfaces such as, for example, FM radio.

The telephone system interface 516 may comprise any number of commercially available telephone system interfaces such as, for example, standard commercial telephone lines.

The telephone system interface 516 is operably coupled to the voice communication interface 510. The telephone system interface 516 may be operably coupled to the voice communication interface 510 using any number of commercially available interfaces.

The interface 518 may comprise any number of commercially available communication interfaces. In a preferred embodiment, the interface 518 comprises an RS-422 communications bus operating at 112 kbps. The interface 518 is operably coupled to the VideoEXPLORER 508. The interface 518 may be operably coupled to the VideoEXPLORER 508 using any number of commercially available interfaces.

The local area network 520 translates the random access Ethernet protocol to serial data using the RS-422 protocol and may comprise any number of commercially available locally area networks. In a preferred embodiment, the local area network 520 comprises a Tiny Bridge available from RAD that generates a 128 kbps RS-422 signal.

The local area network 520 is operably coupled to the Ethernet hub 506. The local area network 520 may be operably coupled to the Ethernet hub 506 using any number of commercially available interfaces such as, for example, 10 Base-T or 10 Base-2. In a preferred embodiment, the local area network 520 is operably coupled to the Ethernet hub 506 using 10 Base-T.

The interface 522 may comprise any number of commercially available communication interfaces. In a preferred embodiment, the interface 522 comprises an RS-422 interface operating at 128 kbps.

The interface 522 is operably coupled to the local area network 520. The interface 522 may be operably coupled to the local area network 520 using any number of commercially available interfaces such as, for example, RS-422. In a preferred embodiment, the interface 522 is operably coupled to the local area network 520 using RS-422.

The voice/data/fax/video interface 524 combines receives and combines the signals from the voice communication system 510, video conferencing equipment 508, and the local area network 520 into a serial data stream in the RS-422 protocol for transmission to the modem 528. The interface 524 may comprise any number of commercially available voice/data/fax/video interfaces. In a preferred embodiment, the voice/data/fax interface 524 comprises an Access Plus 100 voice/data/fax/video multiplexer available from Nuera.

The voice/data/fax/video interface 524 is operably coupled to the telephone system interface 516, the interface 518, and the interface 522.

The voice/data/fax/video interface 524 may be operably coupled to the telephone system interface 516 using any number of commercially available interfaces.

The voice/data/fax/video interface 524 is operably coupled to the interface 518. The voice/data/fax/video interface 524 may be operably coupled to the interface 518 using any number of commercially available interfaces.

The voice/data/fax/video interface 524 is operably coupled to the interface 522. The voice/data/fax/video interface 524 may be operably coupled to the interface 522 using any number of commercially available interfaces.

The interface 526 may comprise any number of commercially available communication interfaces. In a preferred embodiment, the interface 526 comprises an RS-422 serial interface operating at 256 kbps.

The interface 526 is operably coupled to the voice/data/fax/video interface 524. The interface 526 may be operably coupled to the voice/data/fax/video interface 524 using any number of commercially available interfaces.

The modem 528 provides a digitally modulated signal to the satellite transceiver 530 and may comprise any number of commercially available modems. In a preferred embodiment, the modem 528 comprises a Radyne modem that provides a quadrature phase shift keying (QPSK) signal to the satellite transceiver 530.

The modem 528 is operably coupled to the interface 526. The modem 528 may be operably coupled to the interface 526 using any number of commercially available interfaces.

The transceiver 530 provides the proper transmitted RF output power level and frequency for the assigned satellite and may comprise any number of commercially available transceivers. In a preferred embodiment, the transceiver 530 comprises a Ku Band transceiver available from Sierra Com.

The transceiver 530 is operably coupled to the modem 528. The transceiver 530 may be operably coupled to the modem 528 using any number of commercially available interfaces. In a preferred embodiment, the transceiver 530 is operably coupled to the modem 528 using an L Band RF Link.

The satellite dish 532 may comprise any number of commercially available satellite dishes. In a preferred embodiment, the satellite dish 532 comprises a 1.2 m Ku Band self-positioning satellite available from Sierra Com as part number VPS-2. In a particularly preferred embodiment, the satellite dish 532 automatically acquires and tracks with the assigned satellite.

The satellite dish 532 is operably coupled to the transceiver 530. The satellite dish 532 may be operably coupled to the transceiver 530 using any number of commercially available interfaces.

Figure 5A:
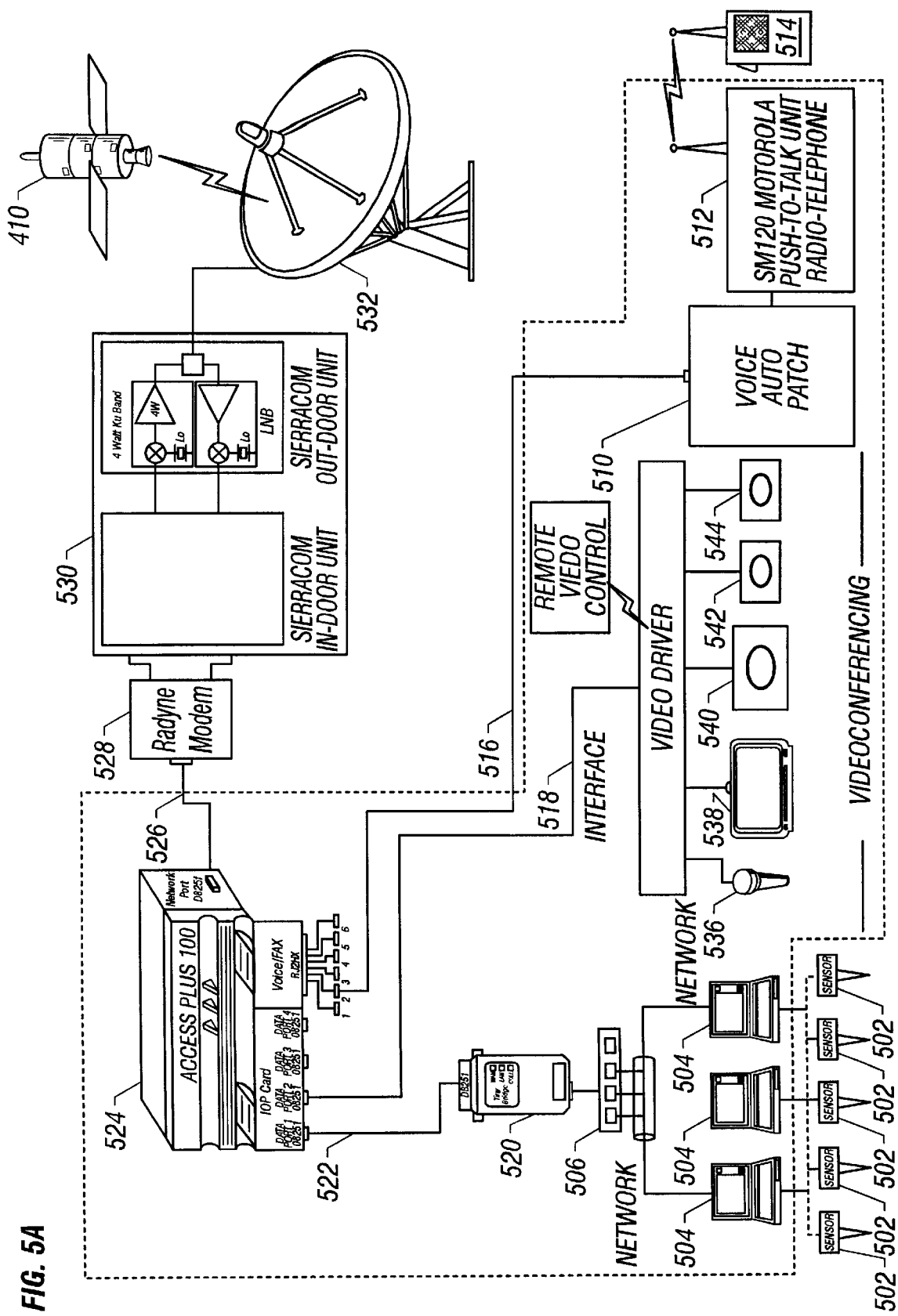
FIG. 5a is a detailed schematic diagram of an alternative embodiment of the remote sensing equipment used in the system of FIG. 4.

Referring to FIG. 5*a*, in an alternative preferred embodiment, the VideoExplorer 508 is replaced with a video driver 534, a microphone 536, a video monitor 538, a main camera 540, a doghouse camera 542, and a field camera 544.

The video driver 534 may comprise any number of commercially available video drivers such as, for example, a Tandberg video driver. In a preferred embodiment, the video driver 534 comprises a Tandberg video driver.

The video driver 534 is operably coupled to the communication interface 518. The video driver 534 may be operably coupled to the communication interface 518 using any number of commercially available interfaces. In a preferred embodiment, the video driver 534 is operably coupled to the communication interface 518 using RS-422.

The microphone 536 may comprise any number of commercially available microphones.

The video monitor 538 may comprise any number of commercially video monitors such as, for example, NEC, ViewSonic or SONY.

The main camera 540 may comprise any number of commercially available cameras such as, for example, SONY, Cannon or his.

The doghouse camera 542 may comprise any number of commercially available cameras such as, for example, SONY, Cannon or Axis.

The field camera 544 may comprise any number of commercially available cameras such as, for example, SONY, Cannon or Axis.

The microphone 536, video monitor 538, main camera 540, doghouse camera 542, and field camera 544 are operably coupled to the video driver 534. The microphone 536, video monitor 538, main camera 540, doghouse camera 542, and field camera 544 may be operably coupled to the video driver 534 using any number of commercially available interfaces.

Figure 6:
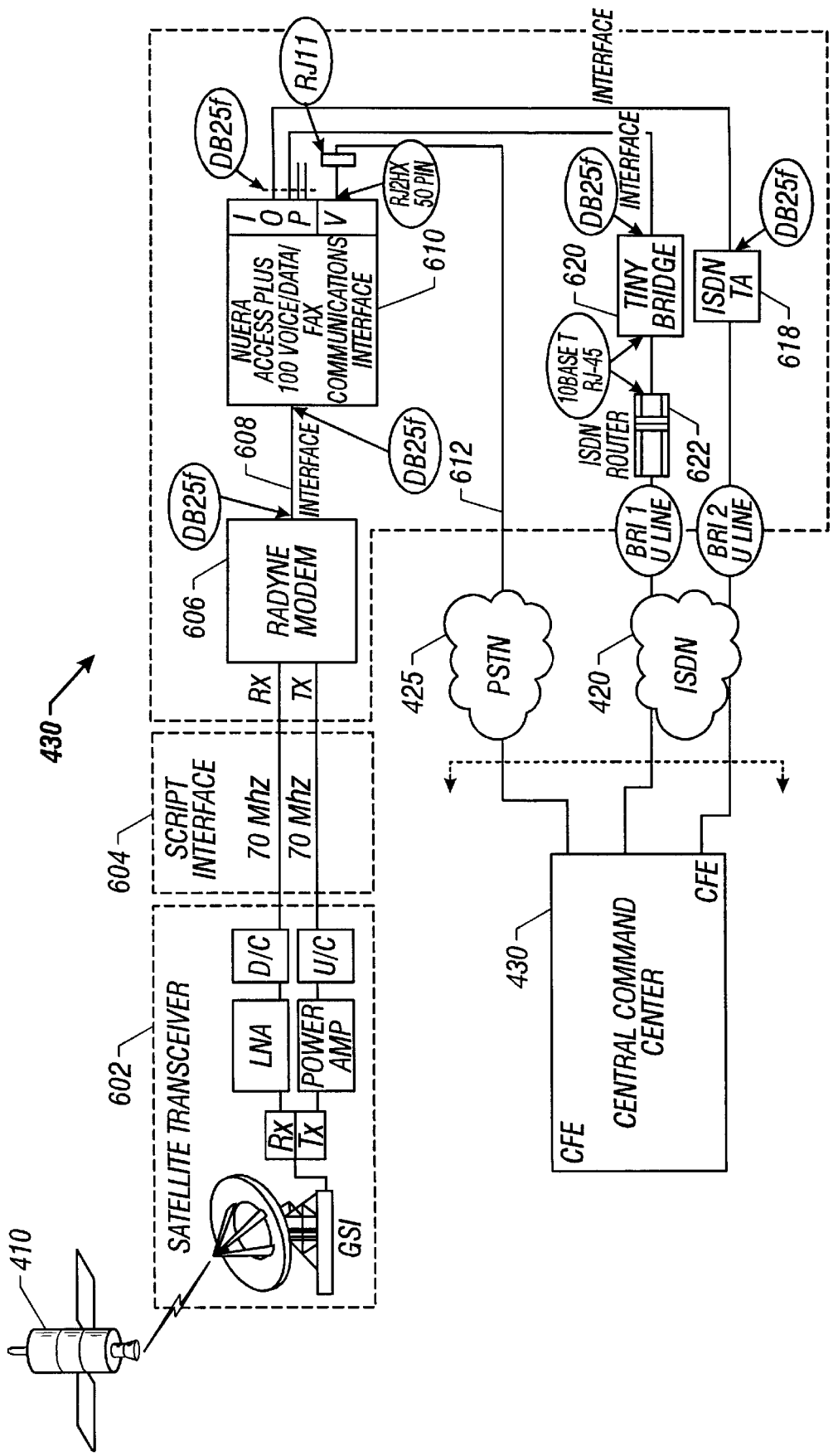
FIG. 6 is a detailed schematic diagram of the local equipment used in the system of FIG. 4.

Referring to FIG. 6, the local equipment 415 includes a satellite transceiver 602, a serial interface 604, a Raydyne modem 606, an RS-422 interface 608, a voice/data/fax/video communications interface 610, a telephone system interface 612, another RS-422 interface 614, another RS-422 interface 616, an ISDN terminal adaptor 618, a tiny bridge 620, and an ISDN router 622.

The satellite transceiver 602 may comprise any number of commercially available satellite transceivers. The satellite transceiver 602 is operably coupled to the satellite 410. The satellite transceiver 602 may be operably coupled to the satellite 410 using any number of commercially available interfaces. In a preferred embodiment, the satellite transceiver 602 is operably coupled to the satellite 410 using Ku Band VSAT available from General Electric.

The serial interface 604 may comprise any number of commercially available serial interfaces. The serial interface 604 is operably coupled to the satellite transceiver 602. The serial interface 604 may be operably coupled to the satellite transceiver 602 using any number of commercially available interfaces.

The modem 606 converts the received RF signal to a serial data stream and may comprise any number of commercially available modems. In a preferred embodiment, the modem 606 comprises a Radyne modem that converts the received RF signal into a serial data stream with a data rate of 256 KBPS using the RS-422 protocol.

The modem 606 is operably coupled to the interface 604. The modem 606 may be operably coupled to the interface 604 using any number of commercially available interfaces.

The communication interface 608 may comprise any number of commercially available communication interfaces. In a preferred embodiment, the communication interface 608 comprises an RS-422 serial interface operating at 256 kbps.

The interface 608 is operably coupled to the modem 606. The interface 608 may be operably coupled to the modem 606 using any number of commercially available interfaces. In a preferred embodiment, the interface 608 is operably coupled to the modem 606 using RS-422.

The voice/data/fax/video communications interface 610 may comprise any number of commercially available voice/data/fax/video communications interfaces. In a preferred embodiment, the voice/data/fax/video communications interface 610 comprises a Nuera Access Plus 100 voice/data/fax/video multiplexer available from Nuera. In a preferred embodiment, the multiplexer 610 provides output ports for network (video), audio and data. In a preferred embodiment, the multiplexer 610 I/O ports support video data transfers at 112 kbps, data transfers at 128 kbsp, and audio at 8 kbps.

The voice/data/fax/video communications interface 610 is operably coupled to the interface 608. The voice/data/fax/video communications interface 610 may be operably coupled to the interface 608 using any number of commercially available interfaces. In a preferred embodiment, the voice/data/fax/video communications interface 610 is operably coupled to the interface 608 using an RS-422 serial interface protocol.

The telephone system interface 612 may comprise any number of commercially available telephone system interfaces such as, for example, a standard telephone line. The telephone system interface 612 is operably coupled to the voice/data/fax/video communications interface 610. The telephone system interface 612 may be operably coupled to the voice/data/fax/video communications interface 610 using any number of commercially available interfaces such as, for example, a standard two-wire analog telephone line.

The communications interface 614 may comprise any number of commercially available communications interfaces. In a preferred embodiment, the communications interface 614 comprises a RS-422 serial communications protocol operating at 128 kbps.

The interface 614 is operably coupled to the voice/data/fax/video communications interface 610. The interface 614 may be operably coupled to the voice/data/fax/video communications interface 610 using any number of commercially available interfaces.

The communications interface 616 may comprise any number of commercially available communications interfaces. The interface 616 is operably coupled to the voice/data/fax/video communications interface 610. The interface 616 may be operably coupled to the voice/data/fax/video communications interface 610 using any number of commercially available interfaces. In a preferred embodiment, the interface 616 is operably coupled to the voice/data/fax/video communications interface 610 using RS-422.

The ISDN terminal adaptor 618 may comprise any number of commercially available ISDN terminal adaptors. The ISDN terminal adaptor 618 is operably coupled to the interface 616. The ISDN TA 618 may be operably coupled to the interface 616 using any number of commercially available interfaces.

The tiny bridge 620 may comprise any number of commercially available communications interfaces. In a preferred embodiment, the tiny bridge 620 comprises a Tiny Bridge available from RAD that converts the RS-422 signal to a 10 base T for connectivity to the ISDN router 622.

The tiny bridge 620 is operably coupled to the interface 614. The tiny bridge 620 may be operably coupled to the interface 614 using any number of commercially available interfaces.

The ISDN router 622 may comprise any number of commercially available ISDN routers. In a preferred embodiment, the ISDN router 622 comprises an Ascend 75 available from Ascend as part number Pipeline 75.

The ISDN router 622 is operably coupled to the tiny bridge 620. The ISDN router 622 may be operably coupled to the tiny bridge 620 using any number of commercially available interfaces such as, for example, 10 Base-T or 10 Base-2. In a preferred embodiment, the ISDN router 622 is operably coupled to the tiny bridge 620 using 10 Base-T.

The PSTN 425 is operably coupled to the interface 612. The PSTN 425 may be operably coupled to the interface 612 using any number of commercially available interfaces. In a preferred embodiment, the PSTN 425 is operably coupled to the interface 612 using a standard telephone network.

The ISDN 420 is operably coupled to the ISDN router 622 and the ISDN TA 618. The ISDN 420 may be operably coupled to the ISDN router 622 using any number of commercially available ISDN interfaces.

The ISDN 420 may be operably coupled to the ISDN TA 618 using any number of commercially available ISDN interfaces.

Figure 7:
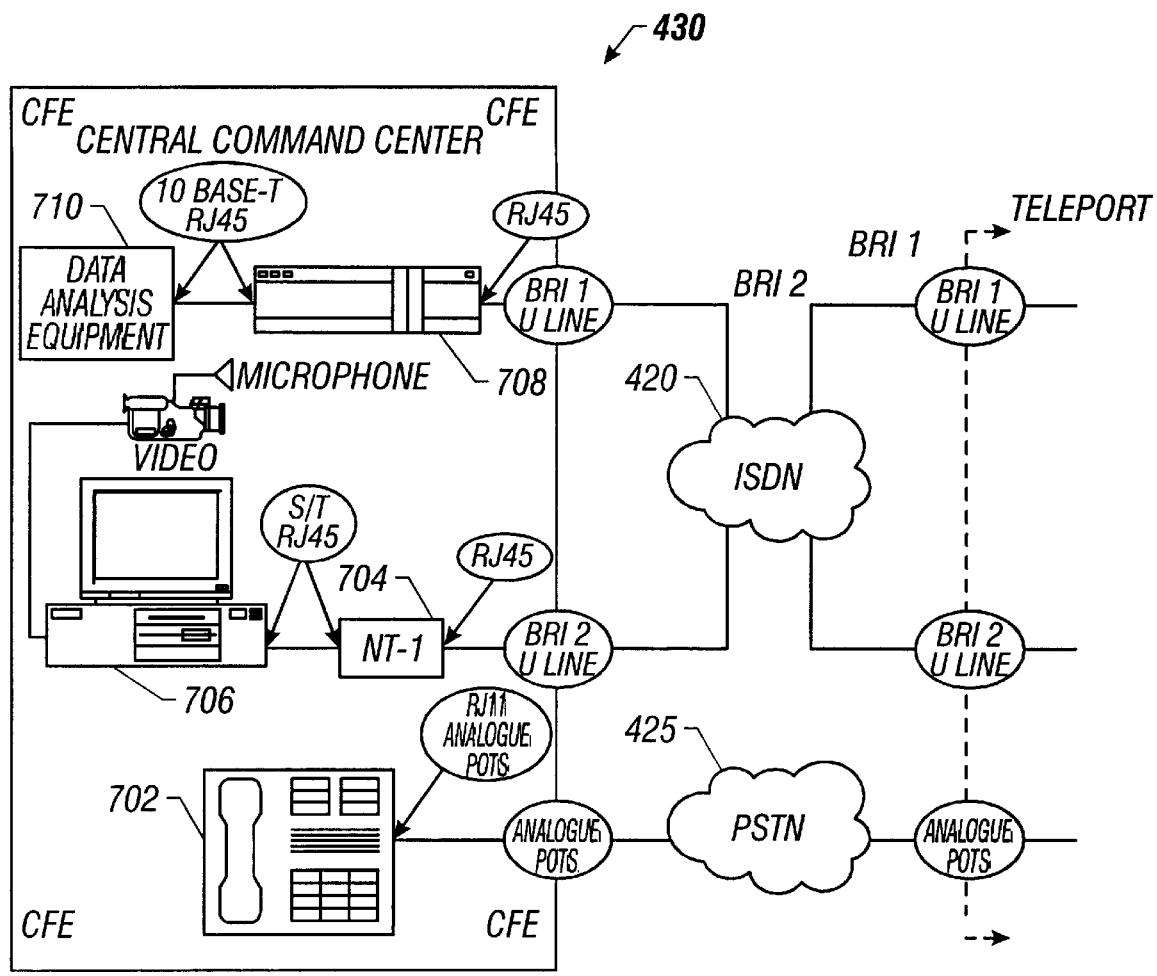
FIG. 7 is a detailed schematic of the central command center used in the system of FIG. 4.

Referring to FIG. 7, the central command center 430 includes a telephone system 702, an NT-1 interface 704, a video conferencing system 706, an ISDN router 708, and data analysis equipment 710.

The telephone system 702 may comprise any number of commercially available telephone systems. The telephone system 702 is operably coupled to the PSTN 425. The telephone system 702 may be operably coupled to the PSTN 425 using any number of commercially available interfaces.

The interface 704 may comprise any number of commercially available communications interfaces. In a preferred embodiment, the interface 704 comprises an NT-1 adaptor. The interface 704 is operably coupled to the ISDN 420. The interface 704 may be operably coupled to the ISDN 420 using any number of commercially available interfaces.

The video conferencing system 706 may comprise any number of commercially available video conferencing systems. In a preferred embodiment, the video conferencing system 706 comprises a Tandberg video conferencing system. The video conferencing system 706 is operably coupled to the interface 704. The video conferencing system 706 may be operably coupled to the interface 704 using any number of commercially available interfaces.

The ISDN router 708 may comprise any number of commercially available ISDN routers. In a preferred embodiment, the ISDN router 708 comprises an Ascend Pipeline 75 available from Ascend as part number Pipeline 75. In a preferred embodiment, the ISDN router 708 converts incoming data to 10 base-T for transmission to the data analysis equipment 710. The ISDN router 708 is operably coupled to the ISDN 420. The ISDN router 708 may be operably coupled to the ISDN 420 using any number of commercially available ISDN interfaces.

The data analysis equipment 710 may comprise any number of commercially available data analysis equipment such as, for example, any personal computer loaded with conventional data analysis software.

The data analysis equipment 710 is operably coupled to the ISDN router 708. The data analysis equipment 710 may be operably coupled to the ISDN router 708 using any number of commercially available interfaces. In a preferred embodiment, the data analysis equipment 710 is operably coupled to the ISDN router 708 using 10 Base-T Ethernet.

In a preferred embodiment, the system 400 includes a plurality of local and remote sites that are integrated in a conventional manner into a network. In this manner, the monitoring and control of seismic accusation at a plurality of remote sites can be networked and managed from a plurality of command and control centers.

Figure 8:
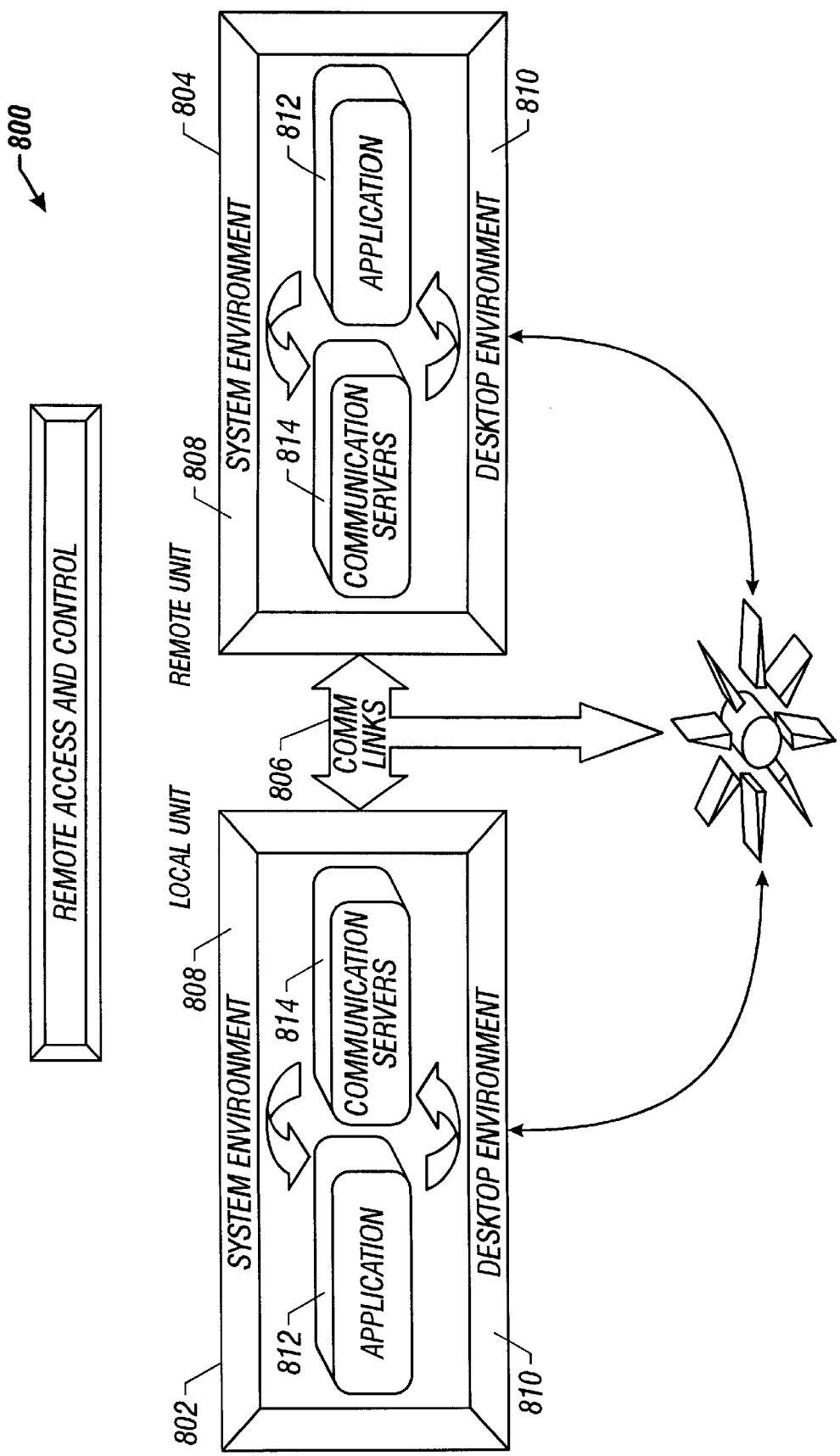
FIG. 8 is a detailed schematic illustration of the system level interface between the local equipment and the remote equipment in the remote control systems for seismic acquisition.
Figure 9:
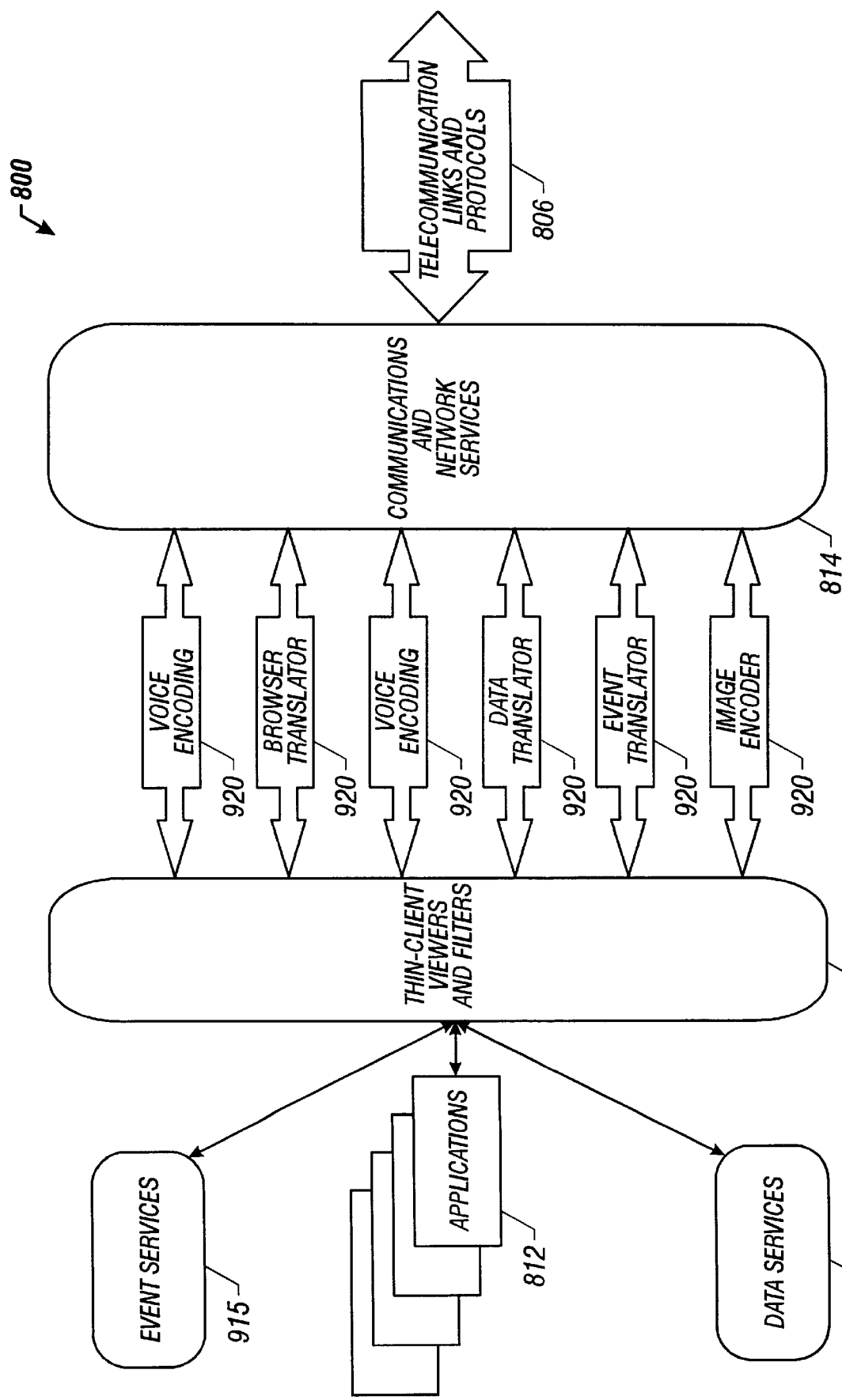
FIG. 9 is a detailed schematic illustration of the system level interface between the local equipment and the remote equipment in the remote control systems for seismic acquisition.

Referring to FIGS. 8 and 9, the system level interface 800 between the local equipment and the remote equipment in the remote control systems 100, 200, 300, and 400 for seismic acquisition will now be described. The system level interface 800 includes local equipment 802, remote equipment 804, and communication links 806.

The local equipment 802 environment includes connectivity to the system environment 808, the desktop environment 810, applications 812, and communications servers 814. Similarly, the remote equipment 804 environment includes connectivity to the system environment 808, the desktop environment 810, applications 812, and communications servers 814. The local and remote equipment in the system may be operably coupled using conventional networking, desktop, communications and applications software and hardware in a conventional manner.

As illustrated in FIG. 9, in a preferred embodiment, the logical connectivity links are transparent to the desktop and application environments. Graphical user interfaces, processes, data services 910 and event services 915 are handled by conventional translation encoding servers 920 communicating in a conventional manner to a thin-client interface 905 of the desktop and applications environments. The encoding methodology (e.g., raw, frame buffering, digitization, cell copy, etc . . . ) and the protocol (e.g., TCP/IP, JPEG, MPEG, etc . . . ) are selected to match the data type and application access methodology (e.g., E-Server, ORB, Client-Server, MOM, xDSL, etc . . . ) in a conventional manner. As will be recognized by persons having ordinary skill in the art, this provides increased flexibility in defining the system configuration.

In a preferred embodiment, conventional network computing software is used in a conventional manner to interface platform dependencies such as operating systems (e.g., Unix, Windows95 and NT, OS2, etc . . . ) and graphical user interface displays and other desktops (e.g., X-Window, Win32, etc . . . ) with the distributed communication services. ORL/Virtual Network Computing is preferably used with Unix/X and Windows/Win32 and Java Applets in a conventional manner to provide a remote desktop display and interaction. Virtual Network Computing is supplied as OpenSoftware from Olivetti Research Laboratory. Virtual Network Computing can be integrated into conventional marine and seismic acquisition systems with conventional modifications to the configuration. HyperAccess 2000 available from Hilgraeve Inc. provides similar capabilities for the PC/OS2 environment for the System 2000. Both Virtual Network Computing and HyperAccess 2000 utilize a main server running at the local system with thin-clients at the remote, end-point systems, and both communicate using standard EtherNet/TCP/IP communications systems. In a preferred embodiment, all display and input devices are also reflected to the remote systems in a conventional manner.

The integration and application of remote access and control of a seismic acquisition system provides the customer with products that will have a major impact upon field and customer operations and costs. At present, many activities must be performed on site and manually. Remote access and control will provide real-time viewing of system status, multi-point system control, as well as white-board, voice and video communications. Furthermore, a plurality of remote and local sites can be networked to provide an integrated system approach to control and management of seismic acquisition.

Some examples of the general categories of applications and products provided by the present system include monitoring, control, and support. The monitoring functions include monitoring of: multiple projects, daily status and crew performance, data quality and equipment testing and tracking, acquisition procedures and parameters, personnel activities and safety. The control functions include control of: multi-site, multiple prospect coordination, direct interaction with real crews at remote sites, fill remote system command and control, synchronized control of multi-vessel, multi-site acquisition. The support functions include support of: remote system support and on-line maintenance, remote software release management, remote on-line documentation and bulletin boards, ability to establish customer support centers with remote training, virtual interaction with real work crews, and built-in communications and conferencing. The seismic monitoring functions include: realtime monitoring, and daily or other periodic wrap-up reports or logs.

The present system will reduce travel time and costs for companies and their personnel. The present system will also increase the availability of expert personnel for decision making and problem solving. The present system will also reduce the time for seismic monitoring, control and report delivery. The present system will also increase quality control by allowing more people access to the system and data. The present system will also increase acquisition efficiency by allowing centralized control. The present system will also permit immediate problem solving support and automatic remote auditing. The present system will also provide the customer will better and faster service. The present system will also reduce errors and increase the ease of remote observation.

A system for remotely controlling and monitoring the acquisition of seismic data has been described which provides a flexible approach to providing remote control and monitoring of seismic data acquisition at a plurality of remote locations. The system may be configured in a plurality of different configurations that allow the system operating cost and access speed to be optimized for a particular location.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A system for remotely controlling and monitoring the acquisition of seismic data, comprising:
    a remote seismic data acquisition system adapted to control the acquisition of seismic data;
    a network communications interface operably coupled to the seismic data acquisition system;
    an integrated services digital network router operably coupled to the network communications interface;
    a first integrated services digital network communications interface operably coupled to the integrated services digital network router;
    a first integrated services digital network converter operably coupled to the first integrated services digital network communications interface;
    a first communications interface operably coupled to the integrated services digital network converter;

a first microwave transceiver operably coupled to the first communications interface;

a second microwave transceiver operably coupled to the first microwave transceiver;

a second communications interface operably coupled to the second microwave transceiver;

a second integrated services digital network converter operably coupled to the second communications interface;

a second integrated services digital network communications interface operably coupled to the second integrated services digital network converter;

an integrated services digital network operably coupled to the second integrated services digital network communications interface; and a local customer support center operably coupled to the integrated services digital network adapted to control the operation of the seismic data acquisition system.

2. A system for remotely controlling and monitoring the acquisition of seismic data, comprising:

a remote seismic data acquisition system adapted to control the collection of seismic data;

a network communications interface operably coupled to the seismic data acquisition system;

an integrated services digital network router operably coupled to the network communications interface;

an integrated services digital network communications interface operably coupled to the integrated services digital network router;

an integrated services digital network converter operably coupled to the integrated services digital network communications interface;

a communications interface operably coupled to the integrated services digital network converter;

a first satellite transceiver operably coupled to the communications interface;

a satellite operably coupled to the first satellite transceiver;

a second satellite transceiver operably coupled to the satellite;

an integrated services digital network operably coupled to the second satellite transceiver; and a local customer support center operably coupled to the integrated services digital network network adapted to control the operation of the seismic data acquisition system.

3. A system for remotely controlling and monitoring the acquisition of seismic data, comprising:

a remote seismic data acquisition system adapted to control the acquisition of seismic data;

a network communications interface operably coupled to the seismic data acquisition system;

a first network radio transceiver operably coupled to the communications interface;

a second network radio transceiver operably coupled to the first network radio transceiver;

a converter operably coupled to the second network radio transceiver;

a telephone system operably coupled to the converter;

a public switched telephone network network operably coupled to the telephone system; and a local customer support center operably coupled to the public switched telephone network adapted to control the operation of the seismic data acquisition system.

4. A system for remotely controlling and monitoring the acquisition of seismic data, comprising:

remote equipment adapted to control the collection of seismic data, collect and transmit seismic data, and to transmit and receive communication signals;

local equipment operably coupled to the remote equipment, the local equipment adapted to transmit and receive communication signals; and a local central command center operably coupled to the local equipment, the central command center adapted to control the collection of seismic data by the remote equipment, transmit and receive communication signals and provide a user interface.

5. The system of claim 4, wherein the remote equipment includes:

sensors adapted to generate seismic signals;

data collection and control computers operably coupled to the sensors;

a video conferencing system;

a voice communication system; and a remote satellite transceiver operably coupled to the data collection computers, the video conferencing system, and the voice communication system.

6. The system of claim 4, wherein the local equipment includes:

a local satellite transceiver;

a telephone communication system operably coupled to the local satellite transceiver; and a data communication system operably coupled to the local satellite transceiver.

7. The system of claim 4, wherein the central command center includes:

data analysis equipment;

video conferencing equipment; and a telephone system.

8. A method of remotely controlling and monitoring the acquisition of seismic data, comprising:

remotely collecting seismic data;

remotely controlling the collection of seismic data;

remotely transmitting and receiving communication signals;

locally transmitting and receiving communication signals;

locally providing a user interface to the communication signals; and locally controlling the collection of the seismic data.

9. The method of claim 8 wherein the transmitting and receiving is performed on a real time basis.

* * * * *

UNITED STATES PATENT AND TRADEMARK OFFICE
CERTIFICATE OF CORRECTION

PATENT NO. : 6,041,283
DATED : March 21, 2000
INVENTOR(S) : Axel Sigmar et al.

It is certified that error appears in the above-identified patent and that said Letters Patent is hereby corrected as shown below:

Column 1,
Line 4, replace "This application is a continuation-in-part provisional application No. 60/095,704, Aug. 7, 1998." with -- This application claims the benefit of the filing date of United States Provisional Patent Application Number 60/095,704 filed on August 7, 1998. --.

Signed and Sealed this

Twelfth Day of October, 2004

JON W. DUDAS
*Director of the United States Patent and Trademark Office*